United States Patent [19]
Arve

[11] 3,823,509
[45] July 16, 1974

[54] MACHINE FOR THINNING AND CULTIVATING SEEDLING PLANTS

[76] Inventor: Harold Arve, 25320 S.W. 108 Ave., Homestead, Fla. 33030

[22] Filed: July 2, 1973

[21] Appl. No.: 375,901

[52] U.S. Cl.................. 47/1.43, 172/81, 172/513
[51] Int. Cl............................................ A01b 41/00
[58] Field of Search........... 47/1.43; 172/5, 81, 509, 172/512, 513, 517, 534

[56] References Cited
UNITED STATES PATENTS
| | | | |
|---|---|---|---|
| 2,580,813 | 1/1952 | Miller | 172/514 X |
| 2,587,950 | 3/1952 | Aggen | 47/1.43 |
| 3,176,778 | 4/1965 | Bezzerides | 47/1.43 X |

OTHER PUBLICATIONS
"Chemical Blocker, Thinner," Western Crops & Farm Management, Sept. 1964, pp. 16–17.

Primary Examiner—Robert E. Pulfrey
Assistant Examiner—Paul T. Sewell
Attorney, Agent, or Firm—Lloyd J. Andres

[57] ABSTRACT

A tractor motivated machine for thinning and cultivating seedling plants in field rows. The transmission of the machine is driven by a tracking wheel for placing each of a plurality of casings over plants at predetermined spacing for a temporary period and permitting a disc plow means on the machine to bury the unwanted intervening plants and protect the desired plants by suction drawing each into a casing by a vacuum supplied thereto by the tractor when the latter is driven astride the row of plants.

5 Claims, 8 Drawing Figures

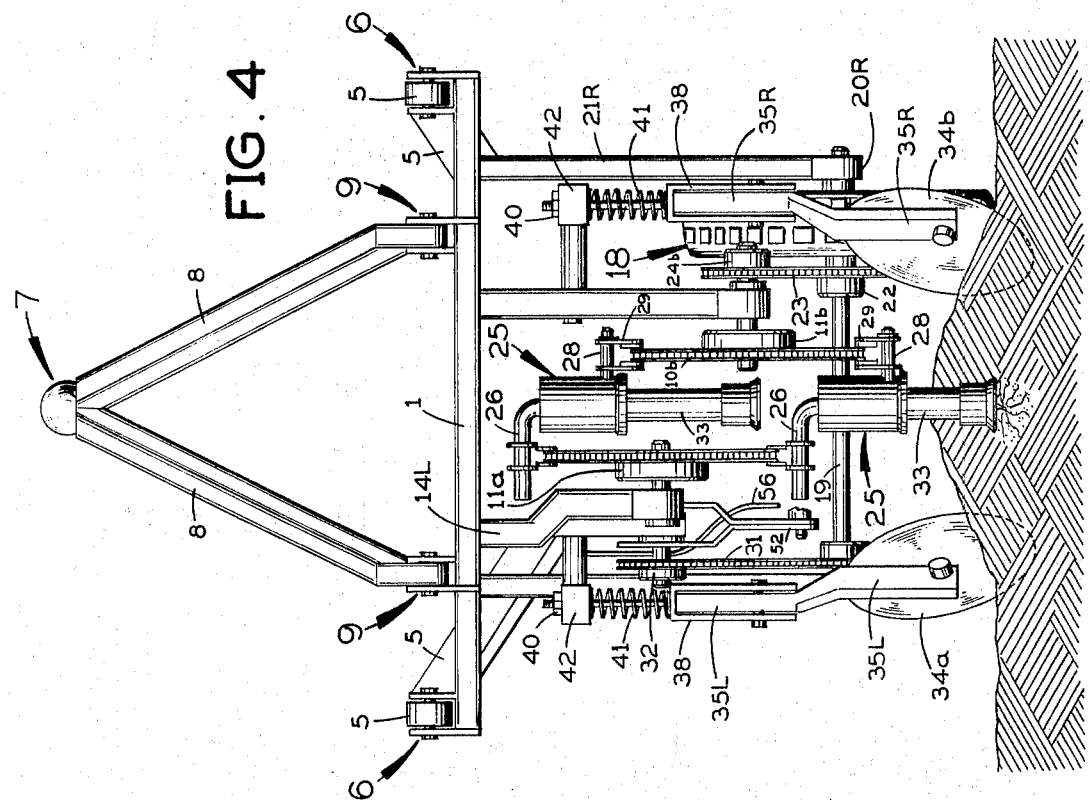
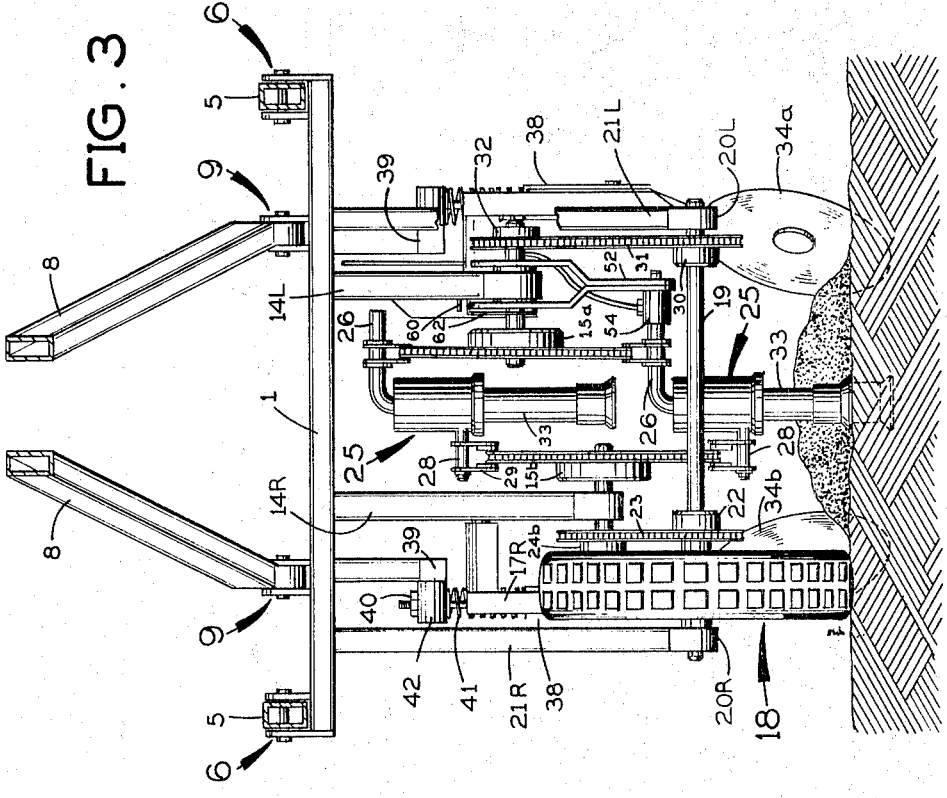

MACHINE FOR THINNING AND CULTIVATING SEEDLING PLANTS

This invention relates in general to a machine attachment to a tractor or power driven cultivator for thinning and cultivating field rows of young seeding plants and simultaneously cultivating the earth surrounding the selected spaced plants.

The thinning of plants resulting from seed sowing by machine requires considerable and expensive hand labor, which problem is solved by the present invention which selects and protects desired spacing of plants and simultaneously plowing under the intervening plants, each of which is protected by a temporary stationary casing supplied by a partial vacuum, the construction of which machine is the principal object of the invention.

Another object of the invention includes a transmission means driven by an earth contact wheel.

A further object of the invention is the provision of a plurality of tubular casings which are adapted to cover the desired plants and remain stationary for a sufficient period to permit thinning of intervening plants.

Another object of the invention is the provision of a laterally spaced pair of plow means for plowing under the earth and destroying the undesired plants in the intervals between the desired plants.

A further object of the invention is the application of a partial vacuum to each casing covering the desired plant and by temporarily holding the leaves thereof in an upright position.

These and other objects and advantages in one embodiment of the invention are described and shown in the following specification and drawings, in which:

FIG. 3 is a cross sectional view taken through section line 3—3, FIG. 1.

FIG. 4 is a rear elevation of the machine shown in FIG. 1.

Figure 1:
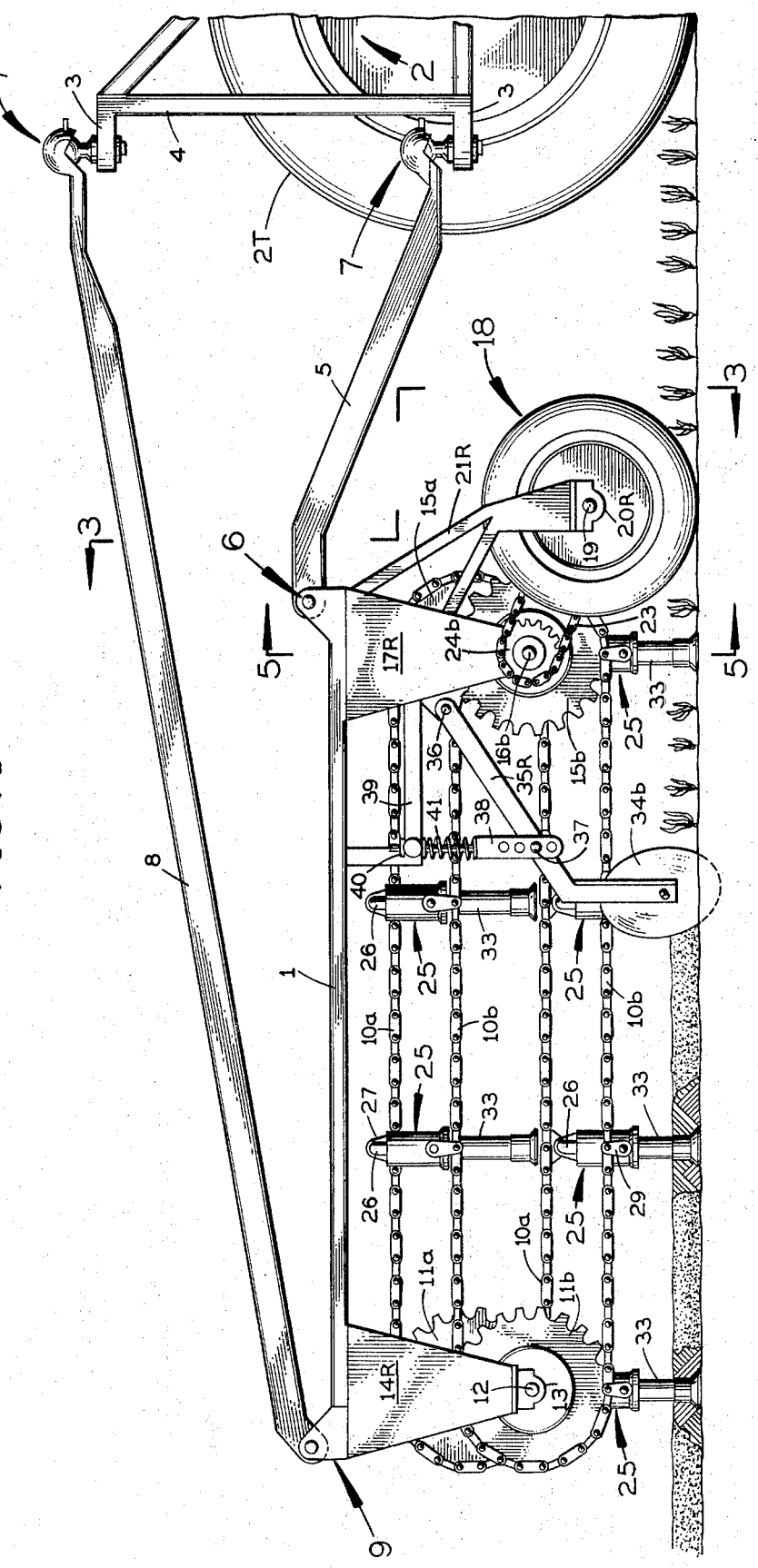
FIG. 1 is a side elevation of the thinning machine in reduced scale.
Figure 2:
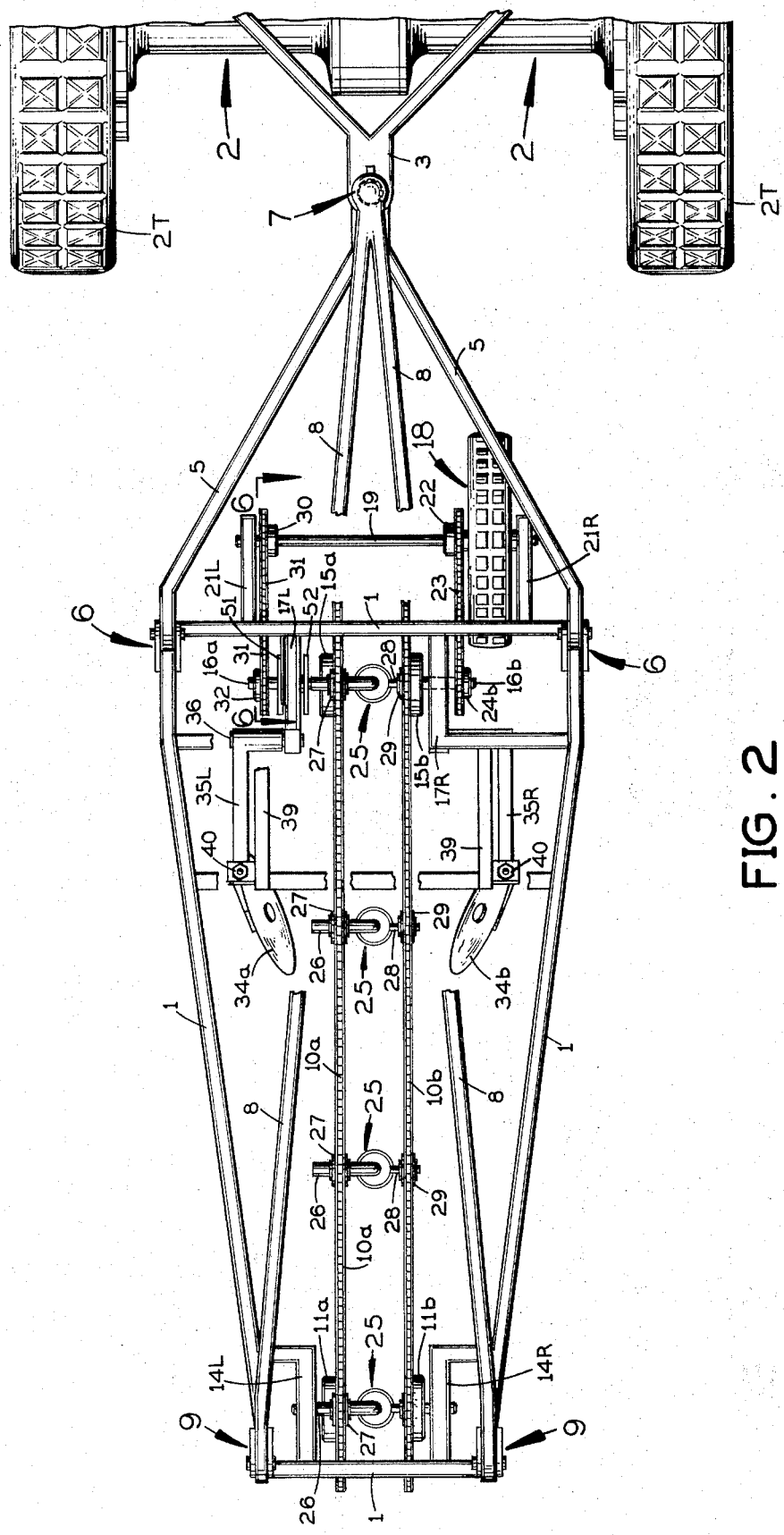
FIG. 2 is a top plan view of the machine.

Referring to FIGS. 1 and 2, all of the transmission and mobile elements of the thinning machine are retained in a rigid main frame 1 and are secured at the forward end thereof to a typical tractor 2 having a drawbar 3 and a vertical extension 4 thereof. The main frame 1 is pivotally secured to the drawbar 3 by a V shaped forward member 5 pivoted to the frame by a pair of clevis-pin assemblies 6 to drawbar 3 with a ball socket assembly 7. The frame is preferably made of rectangular tubing for lightness and ease of welding. A relatively long rear frame support member 8—8 is V shaped and pivotally supported at the rear end of the frame 1 by a pivot clevis means 9 and is secured at the forward end by a second ball socket assembly 7 which is secured to the upper end of the vertical extension 4 having wheels 2T. A pair of like endless chains 10a and 10b are retained in taut position in the forward end of the machine by sprockets 11a and 11b which are journalled on transverse shafts 12a and 12b in a pair of bearings 13 which bearings are supported by a pair of spaced downward depending brackets 14R and 14L rigidly secured to the frame 1.

The chain 10a is driven by a sprocket 15C and chain 10b is driven by sprocket 15D. Both sprockets are driven by independent shafts 16a and 16b journalled in a pair of downward extensions 17R and 17L of the frame 1.

Referring to FIGS. 1 and 2, a rubber tired wheel 18 having suitable non-skid tread is secured to a transverse shaft 19 journalled for rotation in left and right bearings 20R and 20L which are supported by rear offset brackets 21L and 21R, as shown. A sprocket 22 is secured to the shaft and drives a chain 23 which in turn rotates a sprocket 24 secured to shafts 16a and 16b for driving same. It is now apparent that when the tractor draws the machine the wheel assembly 18 will rotate shafts 16a and 16b and drive the chains 10a and 10b simultaneously at a predetermined speed which will result in the lowermost chain assuming zero movement with reference to the earth when the machine is tractor motivated.

Five of the eight plant protective canisters or casing assemblies 25 are shown in working position in FIG. 1 and four of the casing assemblies are shown in FIG. 2. A number of the protective casing assemblies used in this embodiment are not visible in FIGS. 1 and 2, due to the intervening apparatus. It is now apparent that the sequence of each of the eight casing assemblies are positioned in equi-spaced relation to provide continuous sequences of equi-spaced plants corresponding to their spacing when the machine is moved along a row.

Again referring to FIGS. 1 and 2, the upper end portion of each casing assembly 25 has a cylindrical transverse hollow shaft 26 extending from and journalled for rotation on the upper side of chain 10a in a bearing 27 secured in equi-spaced intervals around the outer side of the chain 10a. In a similar manner, each upper portion of casing assembly 25 has a solid shaft 28 positioned below and parallel each shaft 26 which is journalled in a bearing 29 secured to and extending outward from chain 10b directly opposite each bearing 27. A sprocket 30 secured to shaft 19 drives chain 31 which in turn engages and drives a sprocket 32 which will rotate shaft 16b in synchronism with shaft 16a when driven.

The casing assembly 25, which is driven by each chain 10a and 10b, has a slidable plant protective sleeve 33 therein, to be hereinafter described.

Referring to FIGS. 1, 2, and 3, a pair of plow discs 34a and 34b are supported and journalled for rotation by well known means on the lower end portion of offset arms 35R and 35L which are pivoted to extensions 17 of frame 1, and are adapted for vertical movement by a pin 36 secured therein, best shown in FIG. 2. It is to be noted that the discs are positioned in a predetermined fixed angle for plowing the earth from opposite sides of the plants into generally triangular cross section for burying the unwanted plants in each field row. Each of the arms 34R and 35L are vertically adjusted by a pin member 37 in a clevis member 38 supported by an extension 39 of frame 1 by an adjustable nut 40 threaded on the upper shank of clevis member 38. A spring 41 is positioned around the clevis arm and between the clevis and a block 42 pivoted for adjustment about a horizontal axis on offset extension 39 of the frame. The action of the plows 34a and 34b will be hereinafter described.

Each pair of coaxial casing assemblies are connected by their respective shafts 28 by double ended yoke connecting rods 43 which provides for vertical positioning of each of the coaxial pair of plant casing assemblies 25 as they are carried in a vertical axial position between endless chains 10a and 10b during their longitudinal and rotational movement when the chains are motivated.

Figure 5:
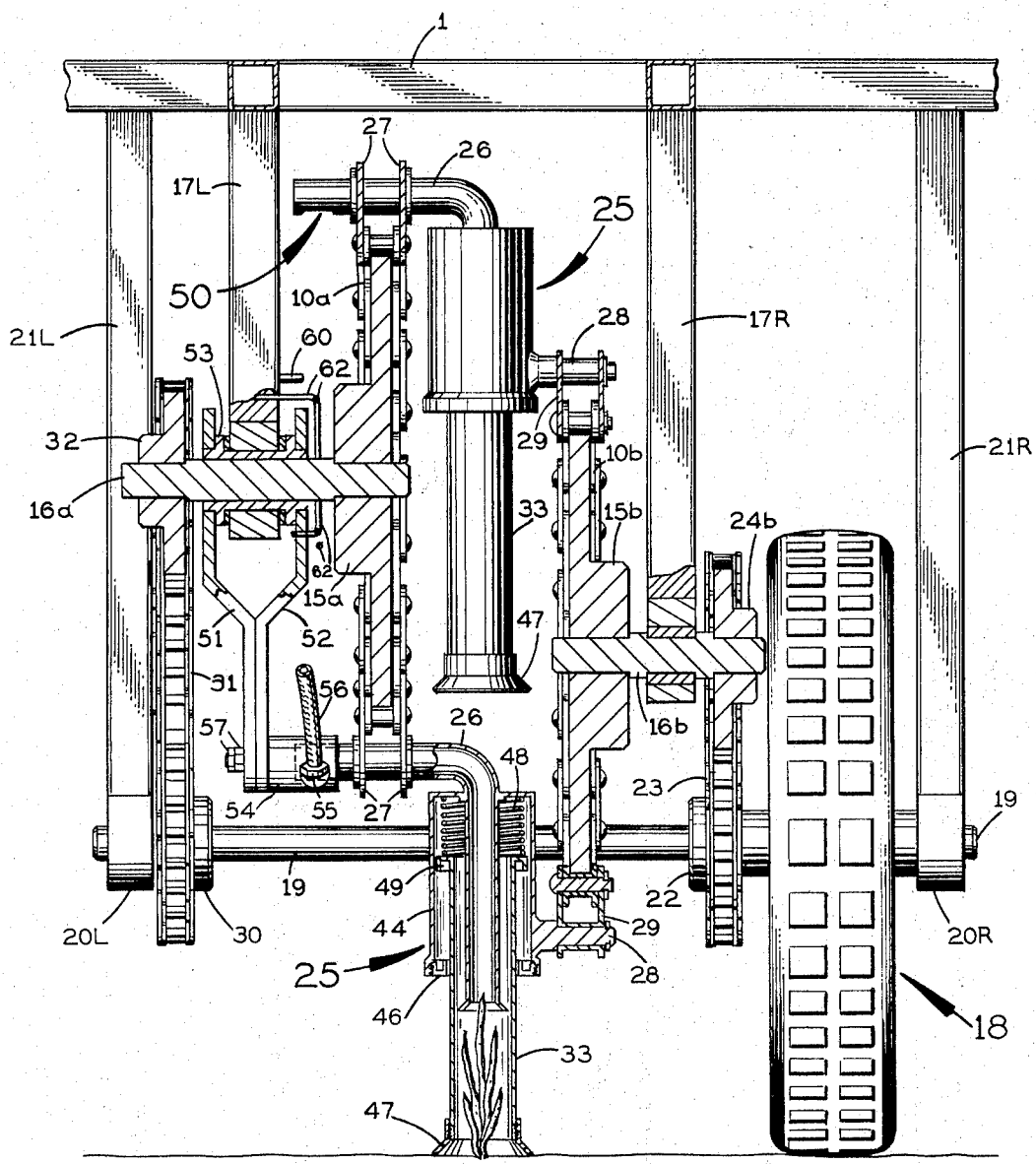
FIG. 5 is an enlarged cross sectional view taken through section line 5—5, FIG. 1.
Figure 6:
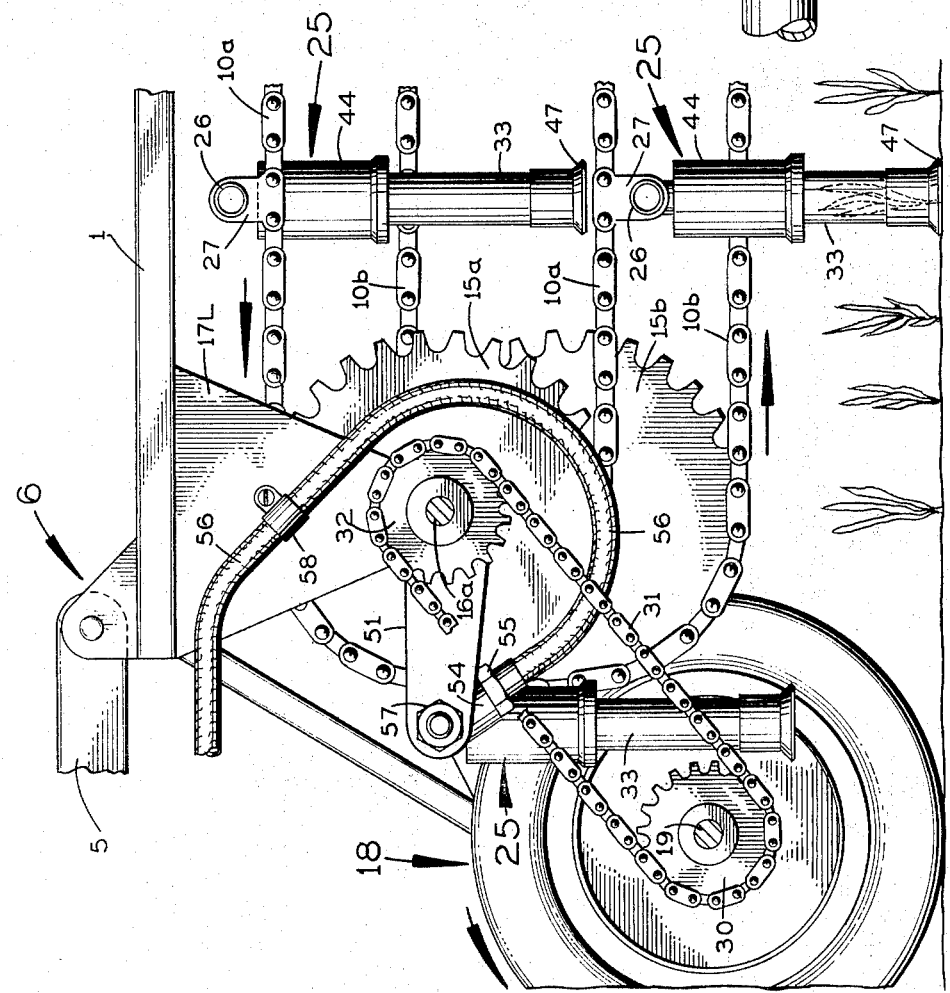
FIG. 6 is an enlarged fragmentary operative view of the rear portion of the machine taken through section line 6—6, FIG. 2.

Referring to FIGS. 5 and 6, each plant casing assembly 25 consists of an upper cylindrical member 44 with its hollow shaft 26 journalled in a bearing means 27 which comprises a pair of arms 45 which are secured by one of the pins of the chain 10a at predetermined intervals around the periphery thereof. The lower shaft 28 is also journalled in bearing 29 which is formed by like arms 45. The lower end of the casing 44 has threaded therein a collar 46 having a coaxial bore therethrough for a slidable fit of the tubular plant protective sleeve 33. The lower end of the sleeve terminates in a divergent conical flange 47. A coil compression spring 48 is positioned against the upper inner end of the cylindrical member 44 and bears upon a collar 49 extending outward from the upper end of the sleeve 33 which collar also serves as the upper guide of sleeve 33.

FIG. 5 shows the casing assembly 25 in its upper position with the sleeve 33 fully extended by the urging action of spring 48. The lower cross sectional view shows the sleeve 33 in its activated protective position with spring 48 substantially compressed with shaft 26 and an input opening 50 in the under side thereof to be hereinafter described.

Figure 7:
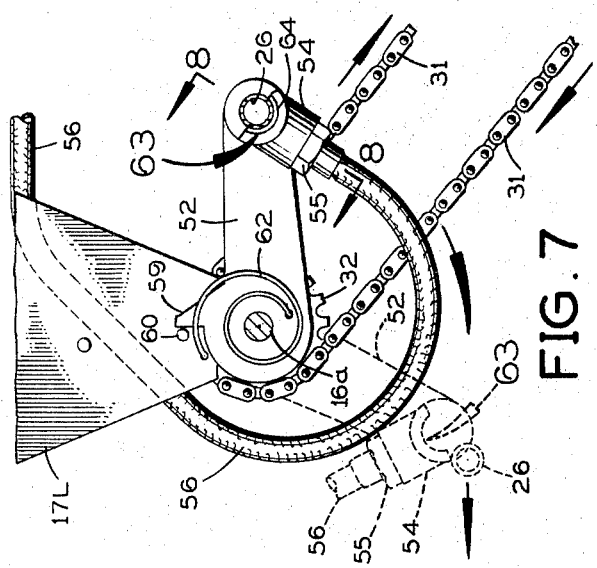
FIG. 7 is a fragmentary view of an opposite side elevation of elements shown in FIG. 6 and illustrating a changed position thereof.

Referring to FIGS. 5, 6, and 7, a yoke assembly formed from members 51 and 52 is journalled for oscillatory rotation about a bearing 53 on shaft 16b. The end portions 51 and 52 have an inward extension air coupling member 54 which retains a hole coupling 55 for securing a hose 56. The extension coupling 54 also has an arcuate aperture for conducting air from the side aperture in the hollow shaft 26 when the shaft is temporarily engaged with the extension coupling 54, to be hereinafter described.

FIG. 6 shows the yoke member 51 and a pair of nuts 57 for holding the extension coupling 54 in its working position with the hose 56 loosely positioned coaxial with the shaft 16b and retained to the frame bracket 17L by a clip 58.

FIG. 7 shows the opposite side of the yoke member 52 and a stop with a projection 59 extending from one edge thereof and shown in engagement with a stop pin 60 secured in extension 17L with the connector coupling 55 having an opening 61 therein whereby the end portion of each shaft 26 will engage the connector coupling 55 and be moved by the shaft 26 through an arc illustrated by dotted lines. During this motion the vacuum will be applied to the casing assembly 25 and when descended over a plant will draw the leaves thereof upward and simultaneously compact the earth around the base of the plant by means of the downward urging action of the flange 47 of the sleeve 33 under the influence of spring 48.

Figure 8:
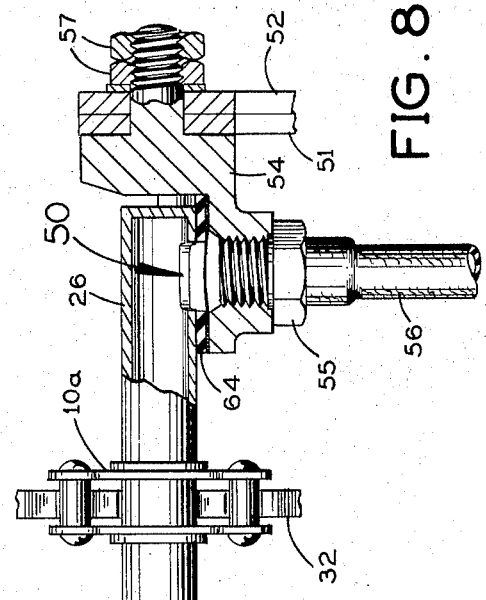
FIG. 8 is a fragmentary enlarged view of the vacuum coupling to the driven drive shaft shown in FIGS. 6 and 7.

FIG. 8 shows the engagement of one of the shafts 26 engaged in recess 63 in shaft 16b. An elastomer pad 64 is secured to the coaxial radiused portion of the coupling 54 to act as a seal around the coupling and the aperture in shaft 26. A torsion spring 62 loosely surrounds the shaft 16b with the inner end thereof anchored through member 51 and the outer end anchored through extension 17L, as shown. The spring normally urges the coupling 54 in the position shown in full lines in FIG. 7.

In operation and referring to FIGS. 1, 2, and 3, and under the assumption that the tractor 2 is pulling the thinning machine in a forward direction, the motivation will accurately follow a normal or even a curved row of plants because of the dual vertical ball couplings which attach the machine to the tractor. It is apparent that the wheel assembly 18 will simultaneously rotate the shafts 16a and 16b and ultimately drive the chains 10a and 10b in the same direction through the operation of the transmission shown in FIG. 6, and since the gear ratio of the wheel to the movement of the chain has been carefully considered and constructed, each of the plant casing assemblies 25 will descend vertically over spaced particular plants and because the rearward velocity of the chains 10a and 10b will be equal to the forward motion of the machine then the subsequently spaced plants will be automatically covered for a short period and followed by the action of the discs shown in FIGS. 3 and 4, the intervening uncovered plants will be buried and cease to grow. When each succeeding sleeve 33 descends and is compressed over each desired plant and during the intermittent movement of the yoke member 51 and 52 shown in FIG. 5, the sleeve 33 and the upper cylindrical member 44 will be evacuated by a partial vacuum from the hose 56 and will first draw the leaves of the plant in an upward direction for protective entry into each sleeve 33.

The vacuum source is well known and is intended to be powered by the tractor take-off element and connected to the thinning machine by hose 56 or be driven by other well known means.

It is apparent that spring 62 will return the vacuum coupling 54 to the position shown in full lines in FIG. 6 with the stop against pin 60 as soon as the protective assembly 25 has traversed the sprocket 11b and the sleeve 33 is over the plant.

It is to be noted that the collar 49 not only compacts the said soil around the roots of the desired plants, but also leaves a depression around the stem thereof for the collection of water.

It is also to be noted that the protective assembly 25 may be modified in size and shape to correspond to particular plant shapes.

During the period when a partial vacuum is applied to the protective assembly, some soil will be drawn into and through hose 56, which may be readily bypassed into a container and a filter in the hose circuit prior to its connection to the vacuum pump.

It is to be understood that certain modifications in construction are intended to come within the teachings and scope of the above specification.

Having described my invention, I claim:

1. A device for use in a machine for thinning seedling plants in field rows comprising a means forming a frame, the front end of said frame terminating in a pair of central vertically spaced pivotal joint means for pivotally securing said frame to the rear portion of a traction means and providing lateral movement of said frame with respect to said traction means, a pair of front and rear left hand sprockets having like teeth and predetermined diameter with each one secured on an independent transverse left shaft for coaxial rotation therewith in said frame and positioned in predetermined spaced horizontal relation with said sprockets in coplanar relation a predetermined left distance from the longitudinal center of said frame, a second like pair of right hand front and rear sprockets with each secured in coplanar relation on a right hand shaft journalled for coaxial rotation therewith in said frame in like predetermined spaced horizontal relation a predetermined right distance from the longitudinal center of said frame with each said right hand sprocket a predetermined vertical distance below each said left hand shaft, an upper endless link chain engaged with each said left hand sprocket and substantially horizontally positioned between said left hand sprockets, a like endless link chain engaged with said right hand sprockets and substantially horizontally positioned therebetween, a drive wheel means journalled for rotation in the front portion of said frame on a transverse axis with the periphery of said wheel means positioned for frictional bearing on the earth of each said row for rotation thereon when said frame is moved forward by said traction means, a transmission means of predetermined ratio driven by said drive wheel means for simultaneously driving one of each right and left said shafts for rotating the rear right and left hand sprockets at the speed of said traction means, a predetermined plurality of plant protective casings with each one thereof having pivots projecting from left and right sides thereof positioned between said chains and journalled in corresponding links in the left and right said chains with the said casings positioned in equi-spaced relation around each of said link chains whereby said casings will move around the path of the said chains in vertical position and sequentially descend over and protect plants established in equal spaced relation when said machine is moved by the traction means and rotating said drive wheel means at one side of said field row.

2. The construction recited in claim 1 including the plant protective casing assembly comprising a main casing having a cylindrical bore at the bottom thereof with a first tubular pivotal shaft extending a predetermined distance from the axis of said bore including a right angled elbow joined to a central opening in the upper end of said casing.

3. The construction recited in claim 1 including a second pivotal shaft of uniform diameter extending a predetermined distance from the lower opposite side of said casing with the axis thereof in parallel spaced relation to the axis of said first pivotal shaft.

4. The construction recited in claim 1 including a telescopic tubular member slidably positioned in said bore and adapted and constructed for predetermined limited reciprocation therein including an inward extending flange around the upper end thereof with a coiled compression spring positioned between the inner top surface of said casing and said flange for normally urging said tubular member in an outward position with respect to said main casing.

5. The construction recited in claim 4 whereby the said telescopic tubular member terminates at the lower end thereof in a divergent circular flange of predetermined width for compacting the earth around each said plant and providing a recess for the accumulation of moisture.

* * * * *